United States Patent [19]

Laue

[11] Patent Number: 5,120,020
[45] Date of Patent: Jun. 9, 1992

[54] VALVE WITH FLUSH ACTION

[75] Inventor: Charles E. Laue, Wilmette, Ill.
[73] Assignee: Charles E. Laue Trust, Wilmette, Ill.
[21] Appl. No.: 698,808
[22] Filed: May 13, 1991
[51] Int. Cl.$^5$ .................. F16K 11/044; F16K 31/50
[52] U.S. Cl. ................................. 251/216; 137/625.5
[58] Field of Search .............. 251/216; 137/625.5, 137/312

[56] References Cited

U.S. PATENT DOCUMENTS

| | | | |
|---|---|---|---|
| 3,115,889 | 12/1963 | Frank et al. | 251/216 X |
| 3,552,421 | 1/1971 | Yocum | 251/216 X |
| 4,215,714 | 8/1980 | Laue. | |
| 4,521,948 | 6/1985 | Laue. | |
| 4,986,502 | 1/1991 | Ceroke | 251/216 |

Primary Examiner—Arnold Rosenthal
Attorney, Agent, or Firm—Hill, Van Santen, Steadman & Simpson

[57] ABSTRACT

An improved valve stem for a valve assembly is provided wherein the valve stem has an external threaded area engaging an internal threaded area of a valve housing for the valve assembly. At least one channel is provided along the threaded area to allow fluid to flow through the threaded area for flushing the threaded area during the manufacturing process of the valve. The channel may be in the form of a flat area along an axial length of the threads, a groove along the length, or a combination of the two.

20 Claims, 1 Drawing Sheet

VALVE WITH FLUSH ACTION

BACKGROUND OF THE INVENTION

The present invention relates to valves and in particular to valves having threaded stems.

Threaded stem valves are used in a variety of environments, in particular being within an air conditioning system. The valves have a threaded stem so that the stem can be rotated by an actuating member to move the valve axially toward and away from a valve seat. Generally, such valves are contained within a valve housing which includes the inlet and outlet ports and with various portions of the assembly being held together, for example by brazing. The threaded valve stem has an exterior threaded portion captured within an internal threaded portion of the valve assembly housing.

In order to provide a bright, shiny finish to the parts, and to inhibit corrosion of the parts, generally a plating material is applied to the parts, for example, nickel plating. Since the parts are held together, for example by brazing, the heating and cooling of the parts during the brazing process causes some discoloration of the metal. Therefore, the plating step occurs after all of the parts have been assembled together.

During the plating process, a plating solution is applied to the valve housing, for example by dipping the valve assembly into the plating solution. Following the plating cycle, the valve assembly is dipped into cold running water three to four times to remove all the plating solution from the interior and exterior of the valve. However, despite the repeated dipping and flushing with water, not infrequently the interior portion of the valve assembly will begin to rust within a matter of a few days following the plating procedure. Such rusting not only inhibits movement of the valve since the rusting generally includes the threaded portion of the valve stem, it introduces contaminants into the stream of material flowing through the valve, such as a refrigerant. Such contaminants may detrimentally affect the operation of the device into which the valve assembly is placed.

Therefore, it would be an advance in the art if a solution were provided to overcome the rusting problem within the valve housing.

SUMMARY OF THE INVENTION

The present invention provides a solution to the rusting problem by providing flushing channels in the area of the threads on the valve stem.

Extensive testing was conducted on valve assemblies during and after the plating step described above and it was determined that acidic plating solution and rinse water were trapped in the helix of the threads of the valve following the plating and rinsing steps. In order to assure that the plating solution and water was completely drained out of the thread helix, axial drain channels were formed in the thread helix. In a first embodiment, two opposed flats were provided to the threaded area, the threaded area having an enlarged diameter over the remainder of the valve stem. Thus, in the threaded area, the diameter of the valve stem was maintained, thus providing a flow through passage on opposite sides of the valve stem in the valve area. During a test of the standard valve assembly and the valve assembly with flats in the threaded area, it was determined that it took approximately twenty hours to obtain two ounces of liquid to drain through the helix of the thread in the standard valve assembly. With the two flats formed on the stem, the valve assembly discharged approximately three gallons of fluid in fifteen minutes. Tests were also performed by cutting open the valve assemblies after the plating and rinsing steps had occured and, in the case of the standard valve assembly, within twenty-four hours, the stem had rust forming in the threads and the rust condition increased markedly thereafter. However, with the valve stem provided with flats, there were no signs of rust even after several months.

In a second embodiment of the invention, additional grooves were placed in the valve stem in the area of the flats, the grooves providing even greater liquid flow. In a similar test, it was determined that the grooved valve stem discharged three gallons of fluid in about five minutes, thus providing approximately three times the liquid flow of that achieved with the valve stem with the two flats.

Thus, the provision of flushing channels in the area of the valve stem threads greatly enhances the flushing of plating solution acids from the helix of the thread to produce a rust free valve assembly.

DETAILED DESCRIPTION OF THE PREFERRED EMBODIMENTS

Figure 1:
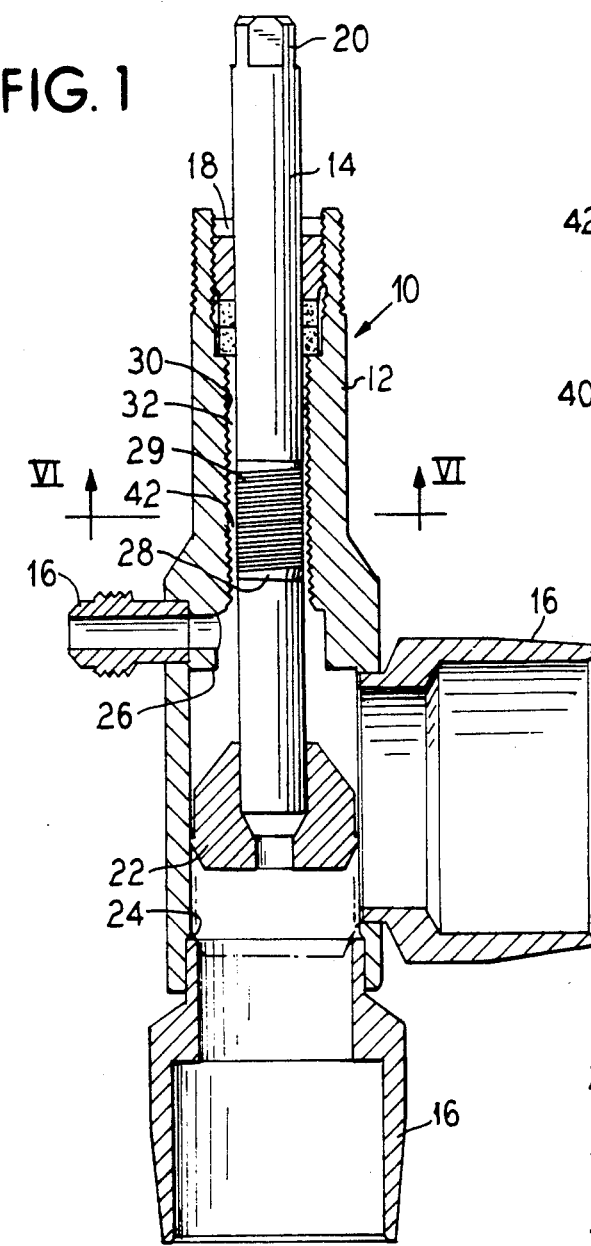
FIG. 1 is a side sectional view of a valve stem assembly embodying the principles of the present invention.

In FIG. 1 there is illustrated a valve assembly generally at 10 which includes a valve housing 12 within which is movably carried a valve stem 14. The valve housing 12 includes a plurality of inlets and outlets 16 as well as an aperture 18 through which an end 20 of the valve stem protrudes. The valve stem 14 has a head 22 thereon which is movable between a first valve seat 24 and a second valve seat 26 to provide selective communication between various of the inlets and outlets 16.

The valve stem 14 is generally cylindrical and has formed thereon, in an enlarged diameter portion 28, a helical thread 29 which is engageable with an internal thread 30 formed within an axial passage 32 of the valve assembly housing 12. The threaded engagement between the valve stem 14 and the valve housing 12 permits relative movement between the two parts such that the head 22 can be moved between the first valve seat 24 and second valve seat 26 by rotational movement of the valve stem. Various of the portions of the valve assembly, such as the inlet and outlets 16 are secured to the valve housing 12 by brazing or other similar assembly methods and, the valve head 22 may also be assembled on to the valve stem 14 in a similar manner.

After assembly of the entire valve assembly 10, a plating process is conducted in which the entire valve assembly is dipped into a plating solution and then is subsequently rinsed in a running water bath.

To ensure that a thorough flushing of the engaging threaded area 29, 30 between the valve stem 14 and valve housing 12 occurs, at least one flushing channel is provided in the threaded area.

Figure 2:
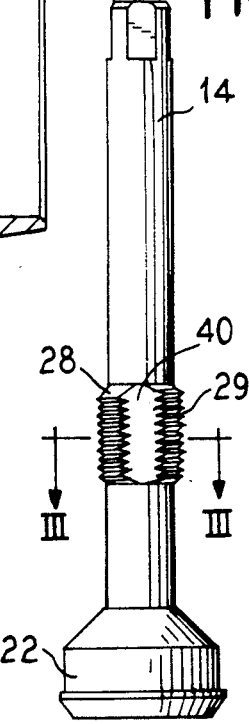
FIG. 2 is a side elevational view of a first embodiment of the valve stem.
Figure 3:
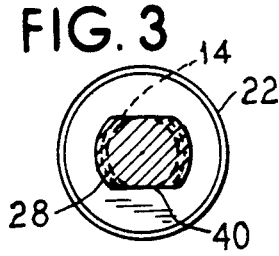
FIG. 3 is an end elevational view with the valve stem of FIG. 2.

As best seen in FIGS. 2 and 3, a first embodiment of the valve stem has a pair of flat surface areas 40 applied on opposite sides of the valve stem in which the increased diameter 28 and threaded portion 29 is reduced to a diameter of the valve stem 14 thus providing a relieved area 42 between the valve stem 14 and the valve housing 12 to form a pair of flushing channels. Thus, the threaded portion 29 of the valve stem becomes a series of partial threads, and when the valve is immersed in the running water rinsing bath, the flushing action takes place automatically with a thorough rinsing of the threaded area occurring.

Figure 6:
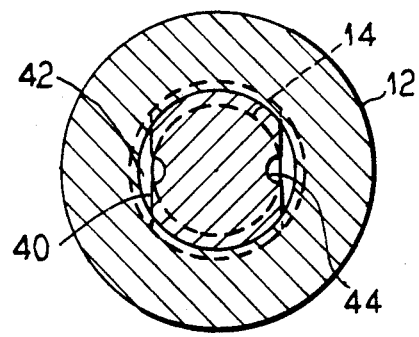
FIG. 6 is a sectional view taken generally along the line VI—VI of FIG. 1.
Figure 4:
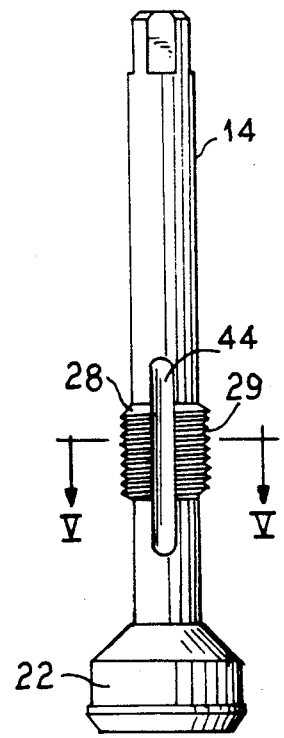
FIG. 4 is a side elevational view of a second embodiment of the valve stem.
Figure 5:
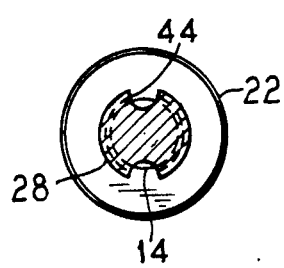
FIG. 5 is a sectional view taken generally along the line V—V of FIG. 4.

FIGS. 4, 5 and 6 show a second embodiment of the present invention in which, in addition to or in place of the opposed flat areas 40 formed on the valve stem, a longitudinal groove 44 is formed in each flat area, extending beyond either end of the enlarged diameter area 28. By providing such a groove 44, the relieved area is increased, without decreasing the length of the partial threads, thus allowing a greater flushing action to occur without detrimentally affecting the threaded engagement between the valve stem and the housing 12. Of course the groove 44 could be utilized alone without the flat areas, and also the number of flushing channels formed by either the flats, grooves or both can be any number sufficient to provide the desired flushing action. The grooves can be applied to the valve stem, valve housing or both as desireable.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A valve stem and a valve housing wherein said valve housing comprises:
   an internal passage and at least one inlet and outlet defining ends of a flow passage portion of said internal passage and having at least one valve seat positioned adjacent to one of said inlet and outlet, and
   said valve stem comprises:
   a cylindrical body extending along an axis with a head at one end for engaging said valve seat in said flow passage portion and an external threaded area formed thereon in an area to be positioned outside of said flow passage portion; and
   at least one axial channel formed through said threaded area to allow axial passage of fluid through said channel outside of said flow passage portion.

2. A valve stem according to claim 1, wherein said channel comprises a flat area formed tangentially to said valve stem along an entire length of said threaded area.

3. A valve stem according to claim 2, wherein said threaded area is formed in an increased diameter area along a portion of said stem and said flat area continues a diameter of said valve stem through said threaded area.

4. A valve stem according to claim 2, wherein said channel includes a groove formed axially along said entire length of said threaded area, in said flat area.

5. A valve stem according to claim 1, wherein said channel comprises a groove formed axially along an entire length of said threaded area.

6. A valve stem according to claim 1, wherein said at least one channel comprises a pair of opposed channels formed on opposite sides of said valve stem.

7. A valve assembly comprising:
   a valve housing having an internal passage and at least one inlet and outlet defining ends of a flow passage portion of said internal passage, said valve housing further having at least one valve seat positioned adjacent to one of said inlet and outlet;
   a valve stem carried in said internal passage in said valve body having a head portion engageable with said valve seat in said flow passage portion to selectively open and close said valve;
   said valve stem having a positioned outside of said flow passage portion with an external thread formed thereon and said valve housing having a portion in said internal passage, outside of said flow passage portion with an internal thread formed therein; and
   at least one channel formed axially through at least one of said threaded portions to provide a communication path along said internal passage outside of said flow passage portion.

8. A valve assembly according to claim 7, wherein said channel comprises a flat area formed on said valve stem tangentially to said valve stem along an entire length of said threaded area.

9. A valve assembly according to claim 8, wherein said threaded area is formed on said valve stem in an increased diameter area along a portion of said stem and said flat area continues a diameter of said valve stem through said threaded area.

10. A valve assembly according to claim 8, wherein said channel includes a groove formed axially along said entire length of said threaded portion of said valve stem in said flat area.

11. A valve assembly according to claim 7, wherein said channel comprises a groove formed axially along an entire length of at least one of at least one of said threaded portions.

12. A valve assembly according to claim 11, wherein said groove is formed on said valve stem.

13. A valve assembly according to claim 7, wherein said at least one channel comprises a pair of opposed channels formed on opposite sides of said valve stem.

14. A valve assembly comprising:
    a valve housing having an axially extending internal passage with an aperture at each end of said passage, at least one inlet and outlet communicating with said passage and defining ends of a flow passage portion of said internal passage, with at least one valve seat positioned adjacent to one of said inlet and outlet;
    a cylindrical valve stem carried in said internal passage in said valve body having a head portion engageable with said valve seat in said flow passage portion to selectively open and close said valve and an actuating end projecting through one of said aperture in said valve housing;

said valve stem having an enlarged diameter portion positioned outside of said flow passage portion with an external thread formed thereon and said valve housing internal passage having a portion in said internal passage, outside of said flow passage portion with an internal thread formed therein; and at least one channel formed axially through at least one of said threaded portions to provide a communication path between said apertures at each end of said internal passage outside of said flow passage portion.

15. A valve assembly according to claim 14, wherein said channel comprises a flat area formed on said valve stem tangentially to said valve stem along an entire length of said threaded area.

16. A valve assembly according to claim 15, wherein said threaded area is formed on said valve stem in an increased diameter area along a portion of said stem and said flat area continues a diameter of said valve stem through said threaded area.

17. A valve assembly according to claim 15, wherein said channel includes a groove formed axially along said entire length of said threaded portion of said valve stem in said flat area.

18. A valve assembly according to claim 14, wherein said channel comprises a groove formed axially along an entire length of at least one of said threaded portions.

19. A valve assembly according to claim 18, wherein said groove is formed on said valve stem.

20. A valve assembly according to claim 14, wherein said at least one channel comprises a pair of opposed channels formed on opposite sides of said valve stem.

* * * * *

UNITED STATES PATENT AND TRADEMARK OFFICE
CERTIFICATE OF CORRECTION

PATENT NO. : 5,120,020

DATED : June 9, 1992

INVENTOR(S) : Charles E. Laue

It is certified that error appears in the above-identified patent and that said Letters Patent is hereby corrected as shown below:

Column 1, line 8 and 9, after "environments", insert --one environment--

Column 4, Claim 7, line 18, after "a", insert --portion--.

Signed and Sealed this

Thirtieth Day of November, 1993

Attest:

BRUCE LEHMAN

Attesting Officer

Commissioner of Patents and Trademarks